US006402186B1

United States Patent
Garland (10) Patent No.: US 6,402,186 B1
(45) Date of Patent: Jun. 11, 2002

(54) COLLAPSIBLE STROLLER

(75) Inventor: Thomas A. Garland, Jamestown, RI (US)

(73) Assignee: Garland, LLC, Jamestown, RI (US)

( * ) Notice: Subject to any disclaimer, the term of this patent is extended or adjusted under 35 U.S.C. 154(b) by 0 days.

(21) Appl. No.: 09/459,714

(22) Filed: Dec. 13, 1999

Related U.S. Application Data (60) Provisional application No. 60/112,139, filed on Dec. 14, 1998.

(51) Int. Cl.$^7$ .................................................. B62B 7/08
(52) U.S. Cl. ........................ 280/647; 280/650; 280/658; 280/47.4
(58) Field of Search ................................ 280/642, 644, 280/646, 647, 650, 657, 658, 47.38, 47.4

(56) References Cited

U.S. PATENT DOCUMENTS

| | | | | |
|---|---|---|---|---|
| 1,482,146 A | * | 1/1924 | Pomilio | 280/644 |
| 3,365,210 A | * | 1/1968 | Patterson | 280/642 |
| 3,556,546 A | * | 1/1971 | Garner | 280/642 |
| 3,653,681 A | | 4/1972 | Virtue | 280/642 |
| 3,689,099 A | | 9/1972 | Patterson | 280/38 |
| 4,448,434 A | * | 5/1984 | Anderson | 280/40 |
| 4,917,392 A | * | 4/1990 | Ambasz | 280/40 |
| 5,087,066 A | * | 2/1992 | Mong-Hsing | 280/644 |
| 5,127,662 A | | 7/1992 | Spak | 280/40 |
| 5,312,006 A | | 5/1994 | Lag | 211/195 |
| 5,348,325 A | * | 9/1994 | Abrams | 280/40 |
| 5,356,171 A | | 10/1994 | Schmidlin et al. | 280/650 |
| 5,468,005 A | | 11/1995 | Yang | 280/40 |
| 5,605,409 A | | 2/1997 | Haut et al. | 403/102 |
| 5,611,560 A | | 3/1997 | Thimmig | 280/642 |
| 5,622,377 A | | 4/1997 | Shamie | 280/642 |
| 5,803,471 A | | 9/1998 | DeMars et al. | 280/40 |
| D411,679 S | * | 6/1999 | Hsieh et al. | D34/24 |
| 5,984,327 A | * | 11/1999 | Hsieh et al. | 280/47.24 |
| 6,053,514 A | * | 4/2000 | Su | 280/40 |
| 6,135,487 A | * | 10/2000 | Flannery et al. | 280/642 |

* cited by examiner

*Primary Examiner*—Brian L. Johnson
*Assistant Examiner*—Bridget Avery
(74) *Attorney, Agent, or Firm*—Barlow, Josephs & Holmes, Ltd.

(57) ABSTRACT

The collapsible stroller (10) includes a fixed-width collapsible frame (12), a seat (14) mounted on the frame (12) across the width, front wheels (18,20) mounted to the frame (12), and rear wheels (22, 24) mounted to the frame (12). The frame (12) is movable between an open condition and a collapsed condition wherein the frame is collapsed into a generally planar configuration. Each of the rear wheels (22,24) is mounted to a respective wheel frame (66, 68) that is in turn pivotably mounted to a respective side portion of the collapsible frame (12). In the open position, the wheels (22, 24) are aligned perpendicular to the width of the stroller (10). The diameter of the rear wheel (22, 24) is substantially equal to the fixed width of the frame (12). When the wheel frames (66,68) are pivoted, the wheels moves behind the stroller wherein the wheels are positioned substantially parallel to the folding plane, and also within the peripheral width and height boundaries of the collapsed frame (12).

6 Claims, 7 Drawing Sheets

COLLAPSIBLE STROLLER

This application is related to Provisional Application Ser. No. 60/112,139, filed Dec. 14, 1998.

BACKGROUND AND SUMMARY OF THE INVENTION

The present invention relates generally to a collapsible, "fixed width" stroller having large diameter wheels. The large diameter wheels are attached to the frame of the stroller such that when the stroller is collapsed the wheels are generally oriented within the same plane as the collapsed frame and generally within the peripheral boundaries of the frame so that the larger wheels do not substantially add any additional width, length or thickness to the collapsed arrangement Within the prior art of baby strollers, there are several different types of strollers including "umbrella" strollers that collapse along the width of the seat, and so called "fixed width" strollers in which the width of the seating area remains fixed in expanded and collapsed conditions. Both of these types of strollers are well known in the art. In the majority of the prior art, these types of strollers are provided with very small diameter wheels even though there is a definite disadvantage to pushing a stroller with small wheels. Strollers with small wheels easily become stuck on small objects on the floor, and are often difficult to turn and maneuver. Larger diameter wheels would obviously provide better maneuverability of the strollers. However, there are very few strollers with large diameter wheels, and the existing strollers with the larger diameter wheels are not fully collapsible. The reason for the prevalence of small wheels in collapsible stroller relates directly to the fact that it has proven extremely difficult to design a stroller with large diameter wheels that can collapse into a small configuration, such as for example, a small enough configuration that can easily fit within the trunk of a car. In view of the foregoing, there is believed to be a need for a collapsible stroller having large diameter wheels that can collapse within the same folding plane as the collapsible frame and also within the same peripheral boundaries i.e. width and height, of the collapsed frame.

In this regard, the present invention preserves the advantages of prior art collapsible strollers while, in addition, providing the improved feature of large diameter wheels not found in currently available devices. More specifically, the preferred embodiments of the present stroller relate primarily to a fixed width collapsible stroller wherein the stroller frame folds into a substantially planar condition and such that the width of the seat does not change between the expanded and collapsed conditions. As stated above, these types of fixed width collapsible stroller frames are well known in the art. The stroller comprises a collapsible frame having a predetermined width, a seat mounted on the collapsible frame across the width, front wheels mounted to the frame, and rear wheels mounted to the frame. The frame is movable between an open condition and a collapsed condition wherein the frame is collapsed into a generally planar configuration. The width of the collapsed frame defines the plane in which the entire stroller is collapsed. The width of the frame remains fixed in both the open and collapsed conditions.

Turning now to the wheels, each of the rear wheels is mounted to a respective wheel frame that is in turn movably mounted to a respective side portion of the collapsible frame. In the open position, the rear wheels are aligned perpendicular to the width of the stroller as would be the case in any stroller. The diameter of the rear wheel can range from slightly larger than a conventional stroller wheel to a diameter that is substantially equal to the fixed width of the frame. The wheel axis is positioned rearwardly of the pivot axis of the wheel frame relative to the collapsible frame so that the wheel frame and wheel can be pivoted from its open position, i.e. perpendicular to the width, to a folded position wherein the wheel is disposed parallel to the folding plane of the frame. In other words, when collapsed, the wheels move to a position substantially parallel to the frame so that the wheels are positioned either within the folding plane, or parallel to the folding plane, and also within the peripheral width and height boundaries of the collapsed frame. In this construction, the stroller is provided with larger diameter wheels without substantially adding to the peripheral edge dimensions of the frame. The front wheels can be constructed in a conventional manner, or alternatively can also be constructed with a larger diameter and also so that they move into a position substantially within the folding plane and within the fixed peripheral boundaries of the frame.

In some cases, the wheels will be manually movable between the expanded and collapsed conditions. However, it s contemplated that the stroller can include actuator levers to automatically move the wheels (front and rear) to the proper positions when the stroller is expanded and collapsed.

Accordingly, it is an object of the present invention to provide a collapsible stroller having large diameter wheels.

It is another object of the present invention to provide a collapsible stroller having large diameter rear wheels wherein the diameter of the wheel can be substantially equal to the width of the stroller.

It is yet another object to provide a collapsible stroller with large diameter wheels wherein the wheels move to a collapsed position that is substantially within the folding plane of the frame and also within the peripheral boundaries of the folded frame.

It is still yet another object to provide a collapsible stroller having means for automatically moving the wheels to the proper positions upon expanded and collapsing the stroller.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Referring now to the drawings, the collapsible stroller of the instant invention is illustrated and generally indicated at 10 in FIGS. 1–9. As will hereinafter be more fully described, the stroller 10 is particularly constructed and arranged with large diameter wheels to provide better maneuverability.

The preferred embodiments of the present invention are primarily directed to fixed width strollers although the description should not be considered to be limited by the preferred embodiments.

The stroller 10 includes a fixed-width A-frame collapsible frame assembly generally indicated at 12, a seat assembly generally indicated at 14 mounted within the frame 12, a basket assembly generally indicated at 16 mounted within the frame 12, first and second front wheel assemblies 18, 20, and first and second large diameter rear wheel assemblies 22, 24.

The A-frame assembly includes spaced front forks 26, 28 and a U-shaped handle bar 30 with the arms 32, 34 of the handlebar 30 rotatably connected to the upper ends of the front forks 26, 28 by locking elements 36, 38. The front forks 26, 28 are maintained is a spaced relation at their bottom end by a foot rest 40 that extends therebetween. The frame assembly 12 further includes spaced rear forks 42, 44 each respectively rotatably connected at their upper end to a pivot anchor 46, 48 at a mid-point of the arms 32, 34 of the handle bar 30. In general, the width of the frame 12 is about 15–16 inches for a single stroller. Double-wide strollers would obviously be about 30–32 inches in width. For purposes of the present invention, we will be dealing with a single stroller, although the concepts disclosed herein are equally applicable to double-wide strollers.

The front wheel assemblies 18, 20 as shown in the embodiment in FIGS. 1–7 are conventional in the art, and are pivotably received into the vertical leg portions 50, 52 of the bottom ends of the front forks 26, 28. It is noted that the bottom ends 50, 52 of the front forks 26, 28 are bent downwardly to provide a substantially vertical pivot axis for the front wheels 18, 20.

The seat 14 is mounted across the width of the frame 12 and is formed by a pair of spaced support members 54, 56 and a panel of fabric 58 that extends around the support members 54, 56, the front and rear forks 26, 28 and the handlebar 30. The support elements 54, 56 are rotatably connected to the front and rear forks 26, 28, 42, 44 and extend generally from front to rear of the frame 12 so support the panel of fabric 58 in a generally L-shaped seat formation.

Figure 1:
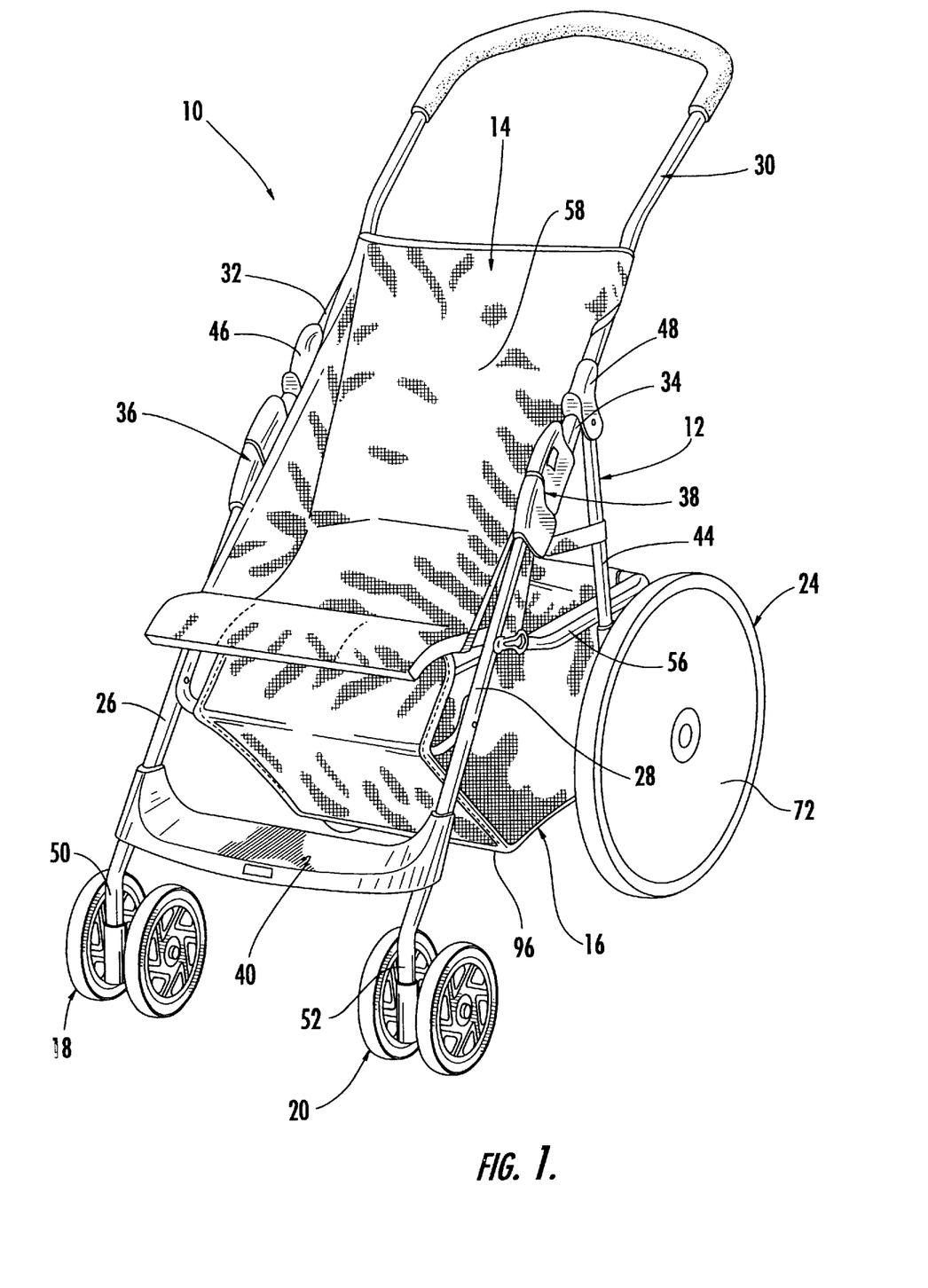
FIG. 1 is a perspective view of the collapsible stroller as constructed in accordance with the teachings of the present invention.
Figure 2:
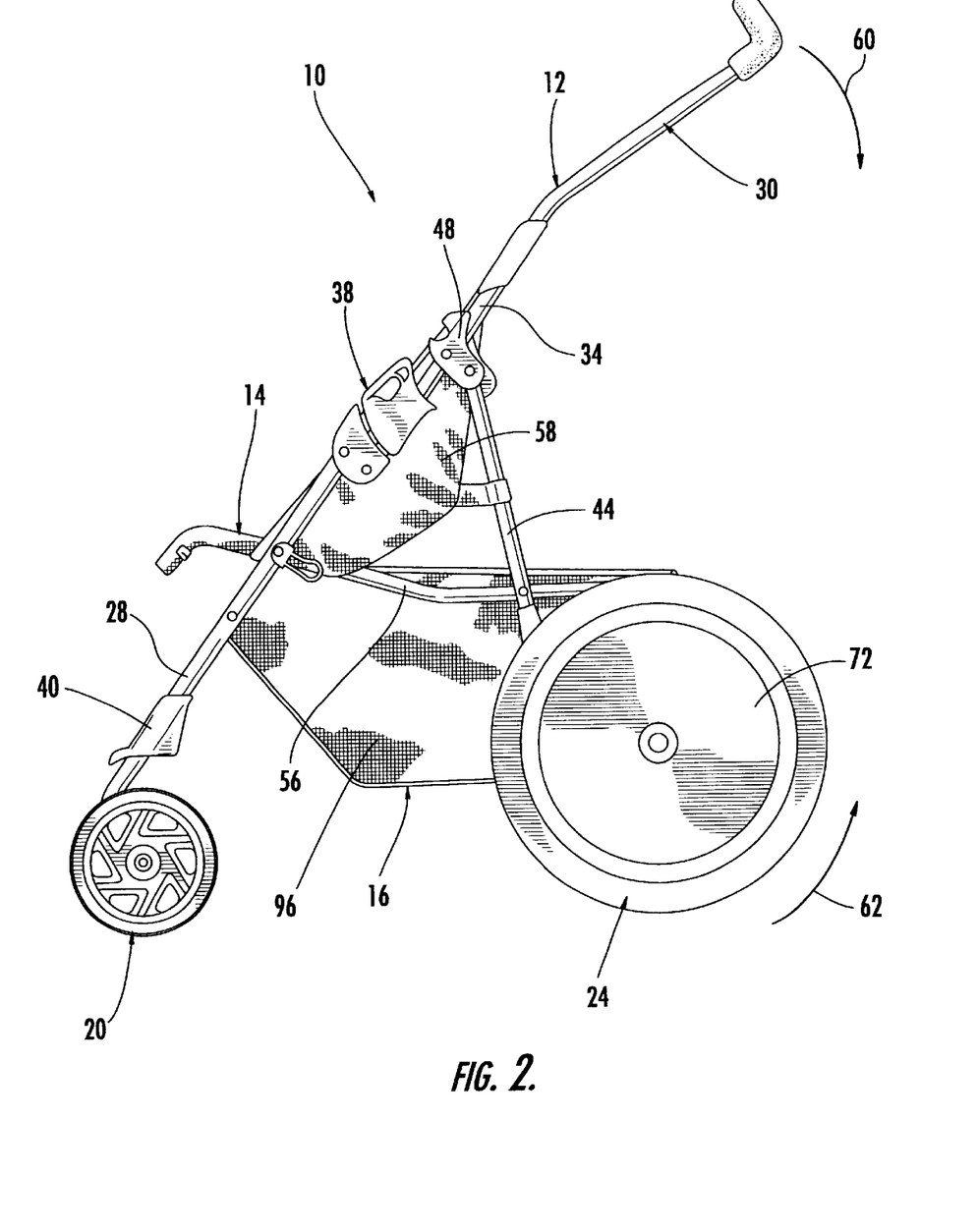
FIG. 2 is a side view thereof.
Figure 3:
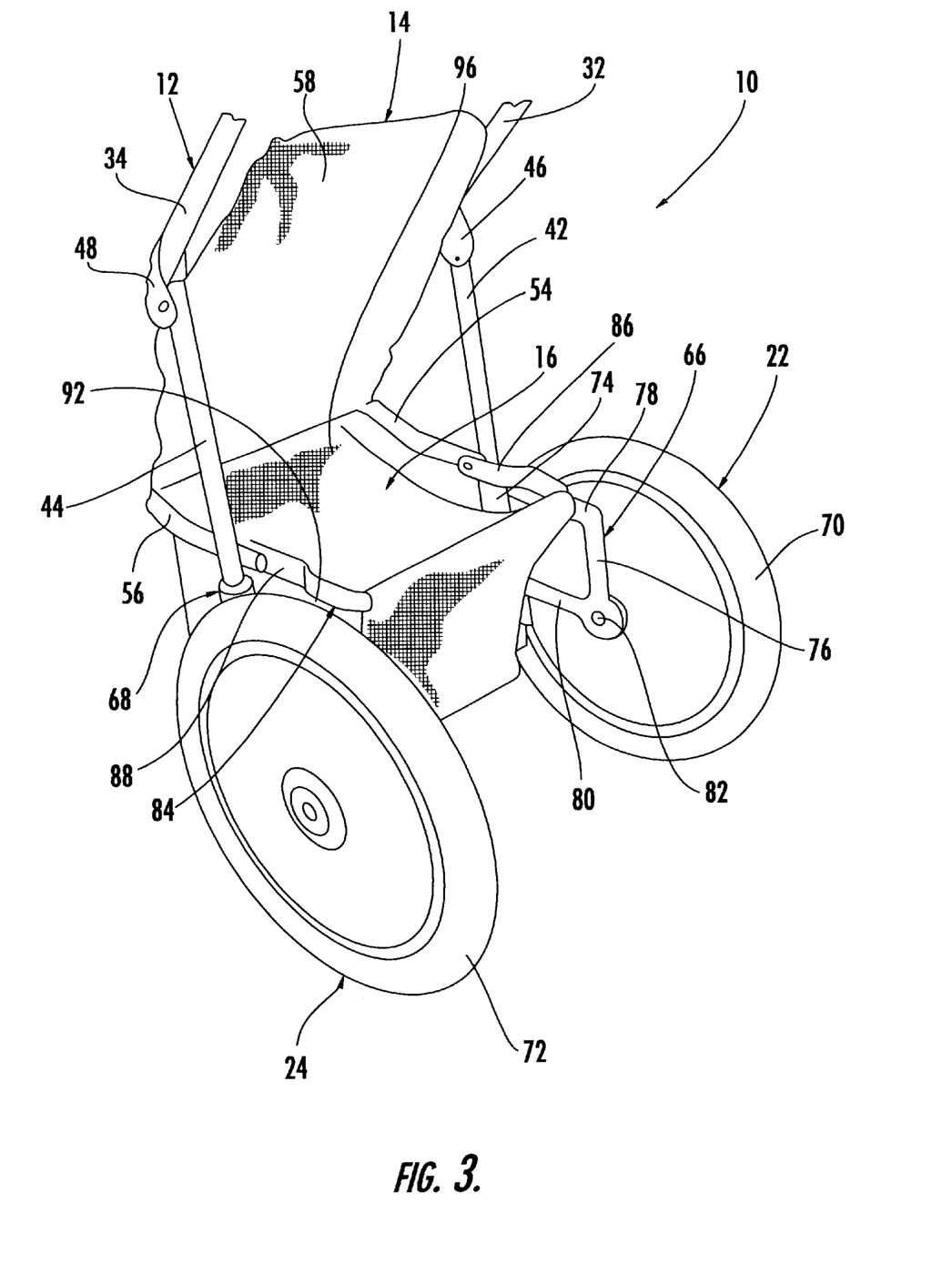
FIG. 3 is a fragmentary rear perspective view showing the arrangement of the pivoting rear wheels.
Figure 6:
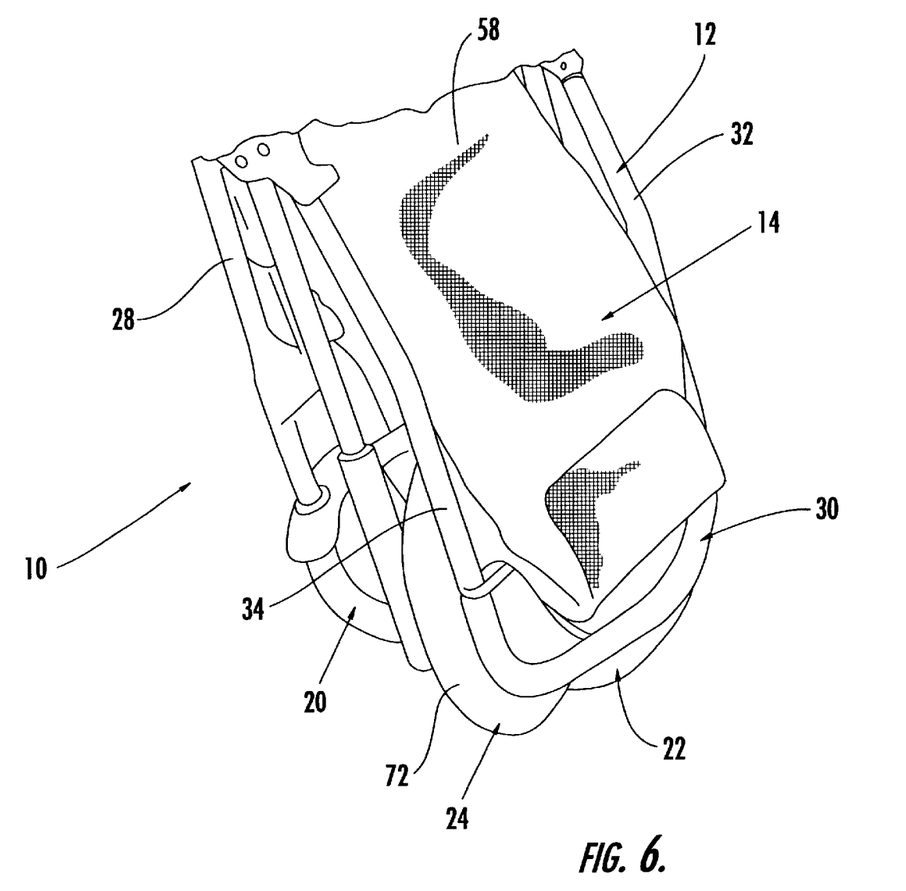
Figure 7:
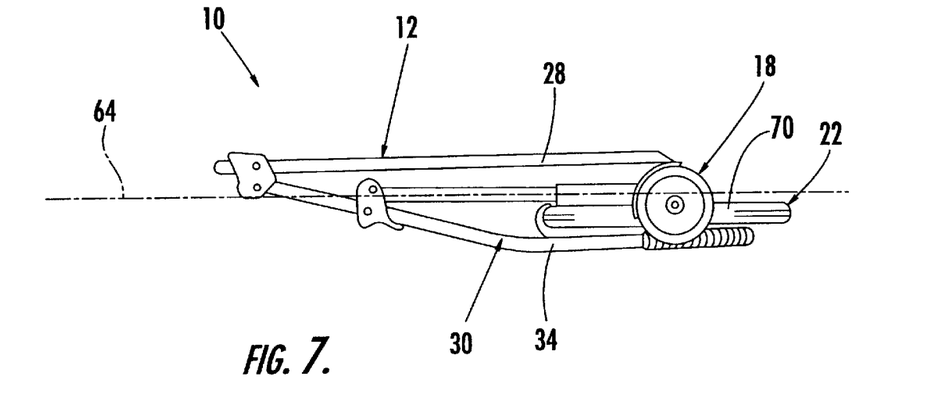
FIG. 7 is a side view of the stroller in a collapsed condition.

The locking elements 36, 38 are the focal point of collapse of the frame 12 providing both a rotating connection between the front forks 26, 28 and the handlebars 32, 34 and a locking mechanism to maintain the frame 12 in the open position. The frame 12 and seat 14 are generally movable between the open position as shown in FIGS. 1 and 2 to a collapsed condition as shown in FIGS. 6 and 7. Referring to FIG. 2, to unlock the frame 12 for collapsing, the upper portions of the locking members 36, 38 are lifted to allow the handlebar 30 to rotate clockwise (arrow 60). The rear forks 42, 44 fold counter-clockwise relative to the handlebar 30 (arrow 62) moving the seat 14 to a generally parallel position with the front and rear forks 26, 28, 42, 44. The handlebar 30 pivots a full 180 degrees to bring the rear forks 42, 44 and the handlebar 30 to rest parallel to the front forks 26, 28. When collapsed, the frame 12 rests in a generally planar configuration with the front forks 26, 28, rear forks 42, 44 and handlebars 30 all generally parallel (see FIG. 7). In this regard, the Applicant has defined the collapsed configuration as resting within a folding plane represented by broken line 64 in FIG. 7. It is also noted that the frame 12 has defined peripheral boundaries within the folding plane, these boundaries being generally measured and defined as the overall length and width of the collapsed frame 12. The collapsible A-frame assembly 12 as described is of known construction and operation and no further detailed description is believed to be necessary.

Turning now to FIGS. 3–6, the construction and arrangement of the rear wheel assemblies 22, 24 will be discussed in detail. The rear wheel assemblies 22, 24 each comprise a wheel frame 66, 68, and a wheel 70, 72 rotatably mounted to the respective wheel frame 66, 68. Both assemblies 22, 24 are identical mirror images and therefore the forthcoming description will proceed on the basis of single assembly 22. The wheel frame 66 is generally square in shape having front and rear legs 74, 76, and top and bottom bars 78, 80. The front leg 74 of the frame comprises a tube into which the respective rear fork 42 of the frame is received to form a generally vertical pivot axis for the wheel frame 66 to pivot relative to the rear fork 42. In this regard, the entire wheel frame 66 is pivotably movable around the pivot axis. The wheel 70 is rotatably mounted to the wheel frame 66 in a bearing 82 located at the elbow between the rear leg 76 and the bottom bar 80. The axis of rotation of the wheel 70 is generally horizontal and is located rearwardly of the pivot axis of the wheel frame 66. The wheel 70 is of conventional in construction although it has a larger diameter than found in a conventional stroller. In this regard, the diameter of the wheel 70 can range between about 10 inches and about 16 inches which is the typical width dimension of the collapsible frame. The largest wheels diameter found in conventional collapsible strollers is believed to be about 7.5 inches. Accordingly, the minimum diameter of the rear wheels in the present stroller is still about 25% larger than the largest wheel currently utilized.

Figure 4:
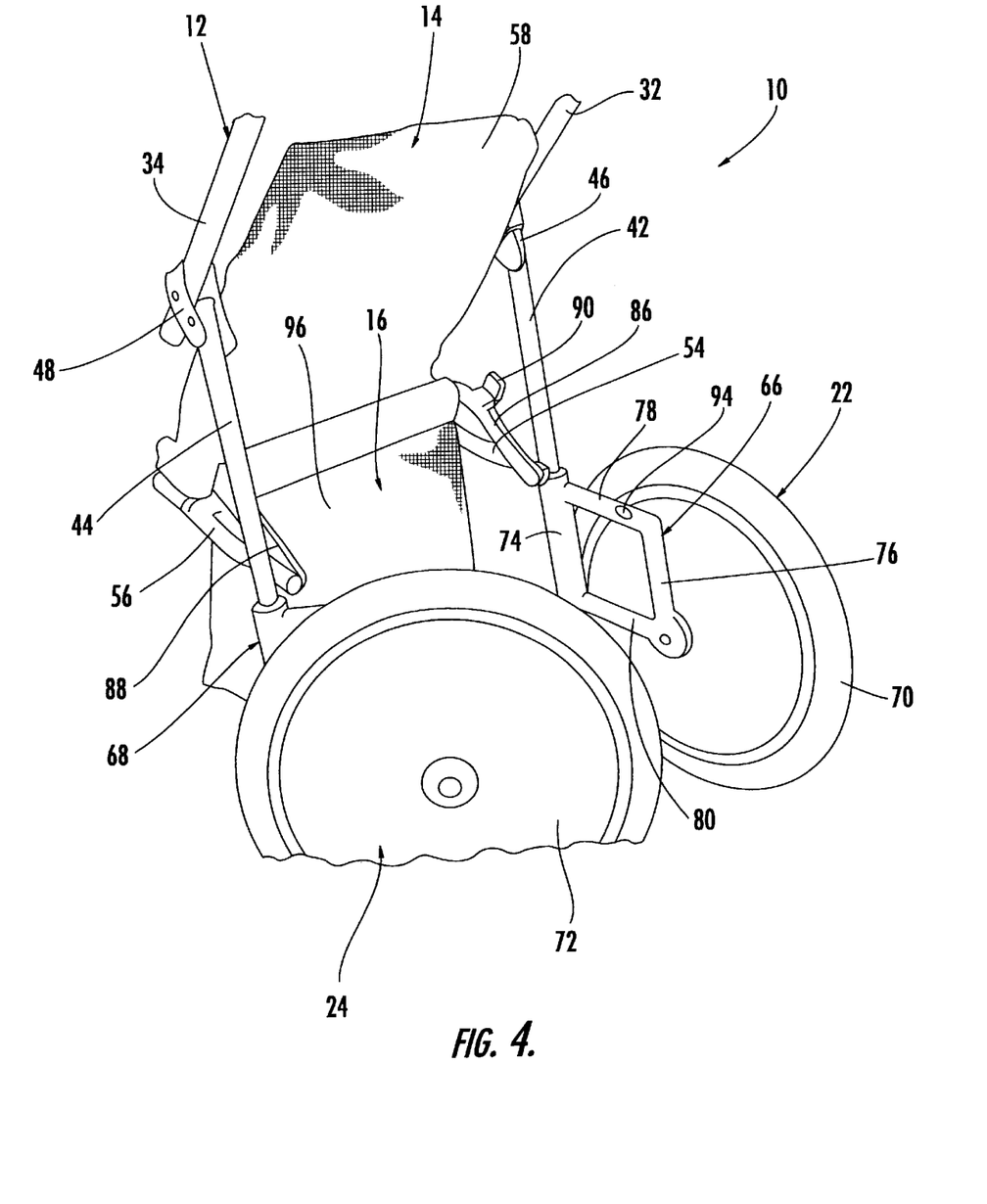
FIGS. 4–6 are other fragmentary rear perspective views showing the sequential steps of collapsing the stroller.
Figure 5:
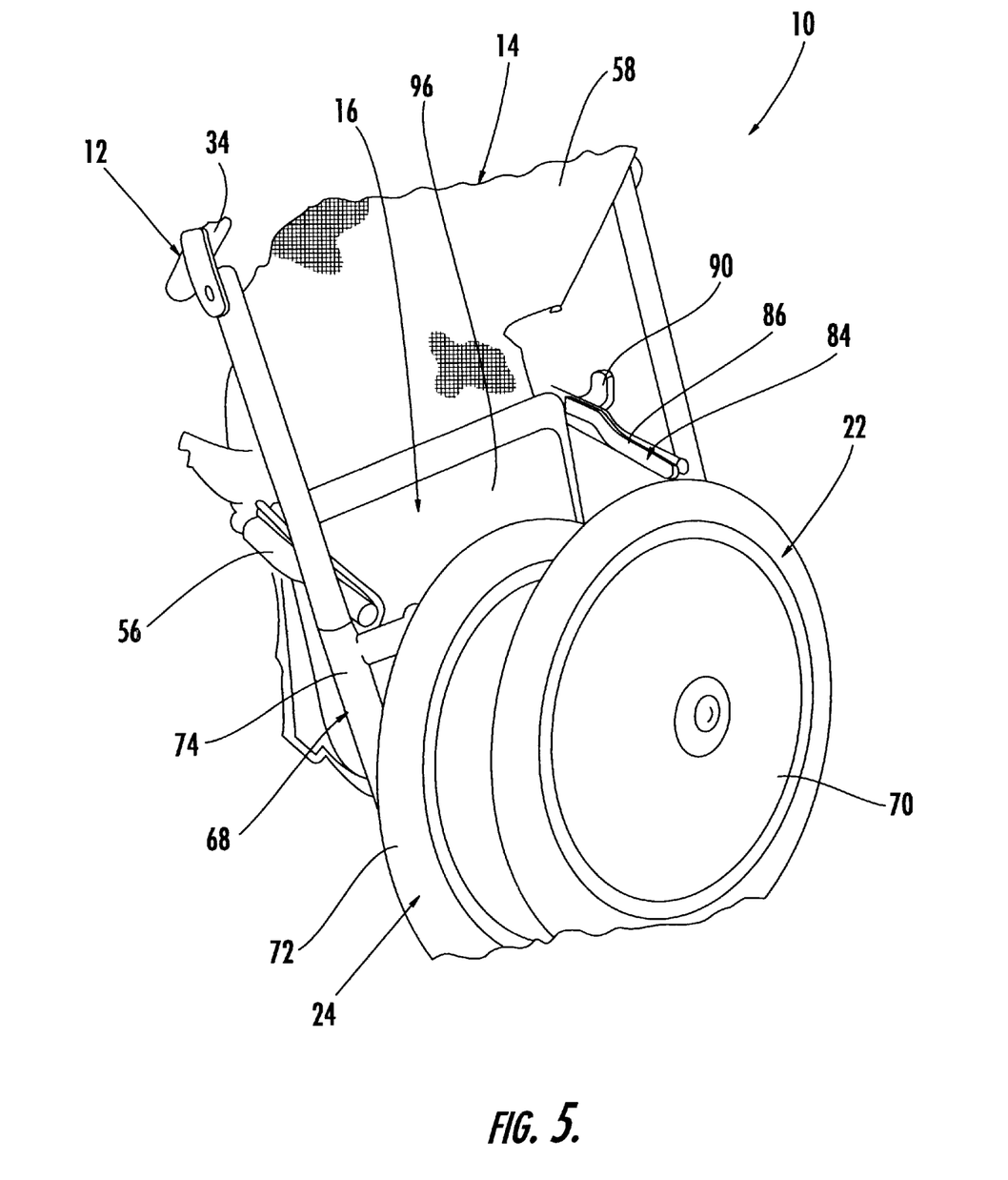

Still referring to FIGS. 3–6, the wheel assemblies 22, 24 are constructed and arranged so as to permit the wheels 70, 72 to be aligned perpendicular to the width of the collapsible frame 12 (FIG. 3) when the collapsible frame 12 is in an open condition, to further permit the wheels 70, 72 to be aligned generally parallel to the folding plane 64 of the collapsible frame (FIGS. 5 and 6), and to further permit the wheels 70, 72 to rest substantially within said peripheral edge boundaries of the collapsible frame when the collapsible frame is in the collapsed condition (see FIG. 6). In FIGS. 4 and 5, the progressive pivoting of the wheels 70, 72 from the open position to the closed position can be seen in better detail. It can be seen that the wheels 70, 72 will overlap in the closed condition.

The stroller 10 still further includes a locking bar generally indicated at 84 to maintain the wheels 70, 72 in the open position during use. More specifically, the locking bar 84 comprises a U-shaped bar. The legs 86, 88 of the bar 84 are pivotably connected to the rear forks 42, 44 at the same pivot point where the seat support elements 54, 56 are connected. To form a lock, the outer surfaces of each leg 86, 88 include a respective locking tab 90, 92 that is slidably interlocked with a complementary locking tab 94 (only one shown) formed on the upper bar 78 of the wheel frames 66, 68. In use, the bar 84 is movable between a locked position (FIG. 3) wherein the bar 84 extends rearwardly between the two wheel frames 66, 68 with the tabs 90, 92, 94 interlocked, and an unlocked position (FIGS. 4 and 5) wherein the bar 84 is rotated upwardly and forwardly to allow rotation of the wheel frames 66, 68 inwardly in overlapping relation.

It is also noted that the locking bar 84 is utilized to form a frame for the basket 16 behind the seat area. In this regard, the basket 16 is formed by a panel of fabric 96 that extends downwardly from below the seat panel 58 across the bottom of the frame 12 and upwardly to the locking bar 84.

Figure 8:
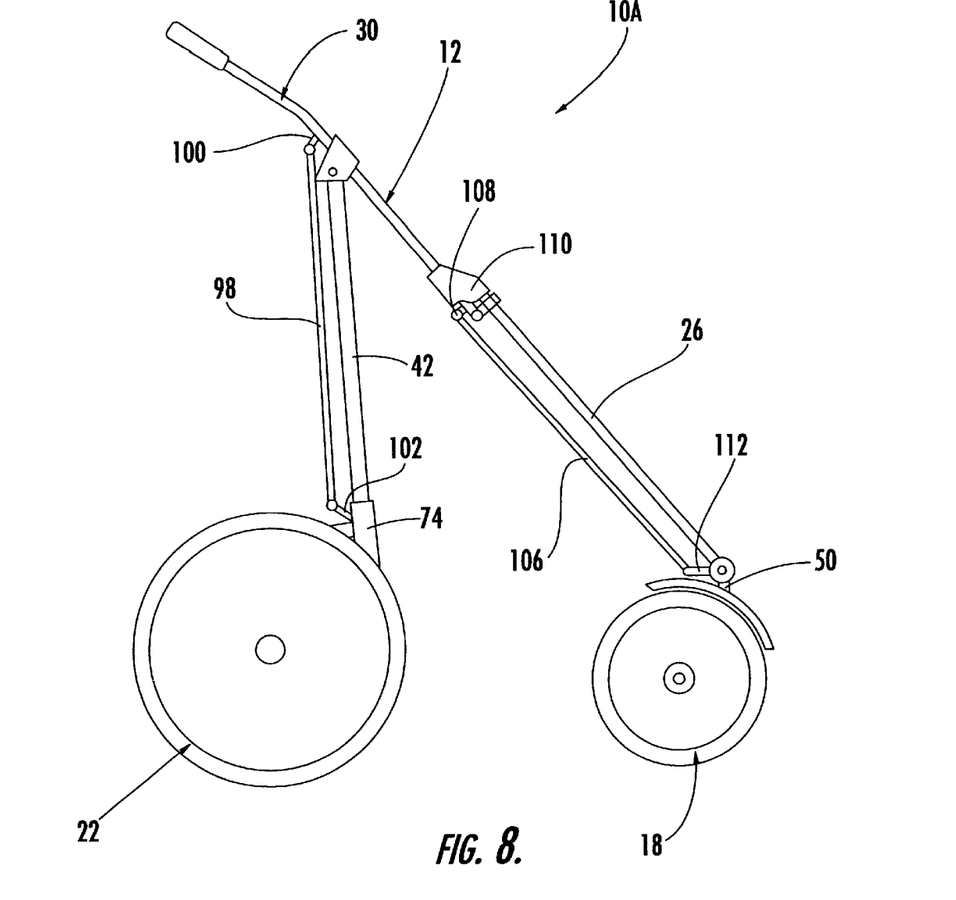
FIG. 8 is a side view of an alternative construction of the strollers with coupling mechanisms to automatically drive the wheels into the correct orientations when opening and closing the stroller.
Figure 9:
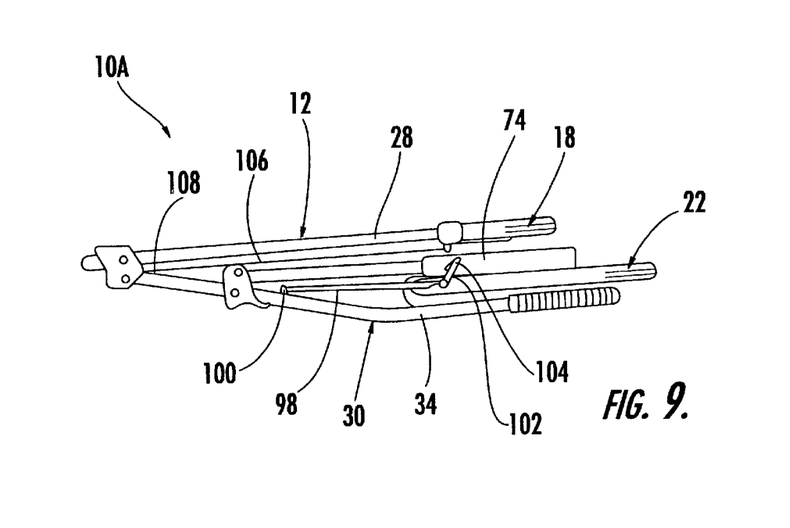
FIG. 9 is a side view thereof in the closed or collapsed condition.

Turning now to FIGS. 8 and 9, there is shown an alternative embodiment of the stroller 10A wherein the stroller 10A is provided with larger front wheels as well, and is still further provided with lever actuators to automatically move both the front and rear wheels between the open and closed positions.

More specifically, the respective rear wheel assemblies 22, 24 would each be connected to an actuator lever 98 (only one shown) that would be moved upon opening or collapsing of the stroller. The upper end of the lever 98 is pivotally connected to an anchor 100 just above the pivot point of the upper end of the rear fork while the lower end of the lever 98 includes a pin 102 that is received into an arcuate cam channel 104 provided in the outer surface of the rear leg of the wheel frame. Pivoting movement of the rear fork towards the handlebar would drive the pin 102 downwardly and along the cam channel 104 to cause rotation of the respective wheel frame 66, 68. Both wheel assemblies 22, 24 would be provided with this type of actuator. Similarly at the front of the stroller, each of the front wheel assemblies 18, 20 is also provided with a lever actuator 106 (only one shown) that is movable upon opening or collapsing of the stroller. However, the purpose of the front actuators is not to rotate the wheels into alignment, but rather to rotate the vertical leg 50 of the front fork to a position within the plane of the front fork where the wheels can then be rotated into the same plane as the front fork. In this regard, the upper end of the lever 106 is pivotally connected to an anchor 108 that forms part of the locking member 110. The anchor point 108 is slightly above the pivot point of the front fork relative to the handlebar so that upon collapsing of the frame, the lever 106 is driven downwardly. The lower end of the lever 112 is rigidly connected to the vertical leg 50 of the front fork 26. Collapsing of the front fork relative to the handlebar will drive the lever 106 downwardly and rotate the vertical leg 50 of the front fork inwardly into the plane of the front fork.

It can therefore be seen that the instant invention provides a unique and improved stroller that preserves all of the functionality and compact collapsing of the prior art strollers while further adding the important feature of large diameter wheels. The simple and elegant incorporation of such a useful and desired feature into an existing proven design represents a significant improvement and advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A collapsible stroller comprising:

a collapsible frame having a width;

a seat mounted across the width of said collapsible frame, said collapsible frame and said seat being constructed and arranged for movement between an open condition for normal use and a collapsed condition wherein said collapsible frame and said seat are generally disposed within in a common folding plane defined across the width of said collapsible frame, said collapsible frame having predetermined peripheral edge boundaries when in a collapsed condition;

at least one front wheel mounted to said collapsible frame; and first and second rear wheel assemblies, each of said first and second rear wheel assemblies including a wheel frame respectively movably mounted to said collapsible frame and a wheel connected to said wheel frame, each of said wheel frames being movably mounted to said collapsible frame so as to permit the wheel to be aligned perpendicular to said width of said collapsible frame when said collapsible frame is in said open condition, and to permit said wheel to be aligned generally parallel to said folding plane of said collapsible frame and also substantially within said peripheral edge boundaries of said collapsible frame when said collapsible frame is in said collapsed condition, said first and second wheel assemblies overlapping each other when the stroller is in said collapsed condition.

2. The stroller of claim 1 further comprising a locking member movably attached to said collapsible frame, said locking member being movable between a locked position wherein the locking member holds the first and second wheel assemblies so as to keep the wheels aligned perpendicular to the width, and an unlocked position wherein the wheel assemblies are free to be moved parallel to said folding plane.

3. A collapsible stroller comprising:

a collapsible frame having a width;

a seat mounted across the width of said collapsible frame, said collapsible frame and said seat being constructed and arranged for movement between an open condition for normal use and a collapsed condition wherein said collapsible frame and said seat are generally disposed within in a common folding plane defined across the width of said collapsible frame, said collapsible frame having predetermined peripheral edge boundaries when in a collapsed condition;

at least one front wheel mounted to said collapsible frame;

first and second rear wheel assemblies, each of said first and second rear wheel assemblies including a wheel frame respectively movably mounted to said collapsible frame and a wheel connected to said wheel frame, each of said wheel frames being movably mounted to said collapsible frame so as to permit the wheel to be aligned perpendicular to said width of said collapsible frame when said collapsible frame is in said open condition, and to permit said wheel to be aligned generally parallel to said folding plane of said collapsible frame and also substantially within said peripheral edge boundaries of said collapsible frame when said collapsible frame is in said collapsed condition; and actuator means for automatically moving said first and second wheel assemblies between said perpendicular and parallel positions responsive to corresponding movement of said collapsible frame between said open and closed positions.

4. A collapsible stroller comprising:

a fixed width collapsible frame having a width;

a seat mounted across the width of said collapsible frame, said collapsible frame and said seat being constructed and arranged for movement between an open condition for normal use and a collapsed condition wherein said collapsible frame and said seat are generally disposed within in a common folding plane defined across the width of said collapsible frame, said collapsible frame having predetermined peripheral edge boundaries when in a collapsed condition, said collapsible frame including locking means for selectively locking said collapsible frame in said open condition;

first and second front wheels mounted to said collapsible frame;

a first rear wheel assembly including a wheel frame and a wheel rotatably mounted to said wheel frame, said wheel having a generally horizontal axis of rotation, said wheel frame being pivotably mounted to a first side portion of said collapsible frame, said wheel frame having a generally vertical pivot axis so as to permit the wheel to be rotated into a first position wherein said wheel is perpendicular to said width of said collapsible frame, said wheel axis being located rearwardly of said axis of rotation of said wheel frame such that said first rear wheel assembly is further rotatable to a second position wherein said wheel is aligned generally parallel to said folding plane of said collapsible frame, said first rear wheel assembly being located substantially within peripheral edge boundaries of said collapsible frame when said collapsible frame is in said collapsed condition; and a second rear wheel assembly including a wheel frame and a wheel rotatably mounted to said wheel frame, said wheel having a generally horizontal axis of rotation, said wheel frame being pivotably mounted to an opposing second side portion of said collapsible frame, said wheel frame having a generally vertical pivot axis so as to permit the wheel to be rotated into a first position wherein said wheel is perpendicular to said width of said collapsible frame, said wheel axis being located rearwardly of said axis of rotation of said wheel frame such that said second rear wheel assembly is further rotatable to a second position wherein said wheel is aligned generally parallel to said folding plane of said collapsible frame, said second rear wheel assembly being located within peripheral edge boundaries of said collapsible frame when said collapsible frame is in said collapsed condition, said first and second wheel assemblies overlapping each other when the stroller is in said collapsed condition.

5. The stroller of claim 4 further comprising a locking member movably attached to said collapsible frame, said locking member being movable between a locked position wherein the locking member holds the first and second wheel assemblies so as to keep the wheels aligned perpendicular to the width, and an unlocked position wherein the wheel assemblies are free to be moved parallel to said folding plane.

6. A collapsible stroller comprising:

a fixed width collapsible frame having a width;

a seat mounted across the width of said collapsible frame, said collapsible frame and said seat being constructed and arranged for movement between an open condition for normal use and a collapsed condition wherein said collapsible frame and said seat are generally disposed within in a common folding plane defined across the width of said collapsible frame, said collapsible frame having predetermined peripheral edge boundaries when in a collapsed condition, said collapsible frame including locking means for selectively locking said collapsible frame in said open condition;

first and second front wheels mounted to said collapsible frame;

a first rear wheel assembly including a wheel frame and a wheel rotatably mounted to said wheel frame, said wheel having a generally horizontal axis of rotation, said wheel frame being pivotably mounted to a first side portion of said collapsible frame, said wheel frame having a generally vertical pivot axis so as to permit the wheel to be rotated into a first position wherein said wheel is perpendicular to said width of said collapsible frame, said wheel axis being located rearwardly of said axis of rotation of said wheel frame such that said first rear wheel assembly is further rotatable to a second position wherein said wheel is aligned generally parallel to said folding plane of said collapsible frame, said first rear wheel assembly being located substantially within peripheral edge boundaries of said collapsible frame when said collapsible frame is in said collapsed condition; and a second rear wheel assembly including a wheel frame and a wheel rotatably mounted to said wheel frame, said wheel having a generally horizontal axis of rotation, said wheel frame being pivotably mounted to an opposing second side portion of said collapsible frame, said wheel frame having a generally vertical pivot axis so as to permit the wheel to be rotated into a first position wherein said wheel is perpendicular to said width of said collapsible frame, said wheel axis being located rearwardly of said axis of rotation of said wheel frame such that said second rear wheel assembly is further rotatable to a second position wherein said wheel is aligned generally parallel to said folding plane of said collapsible frame, said second rear wheel assembly being located substantially within peripheral edge boundaries of said collapsible frame when said collapsible frame is in said collapsed condition; and actuator means for automatically moving said first and second wheel assemblies between said perpendicular and parallel positions responsive to corresponding movement of said collapsible frame between said open and closed positions.

* * * * *